UNITED STATES PATENT OFFICE.

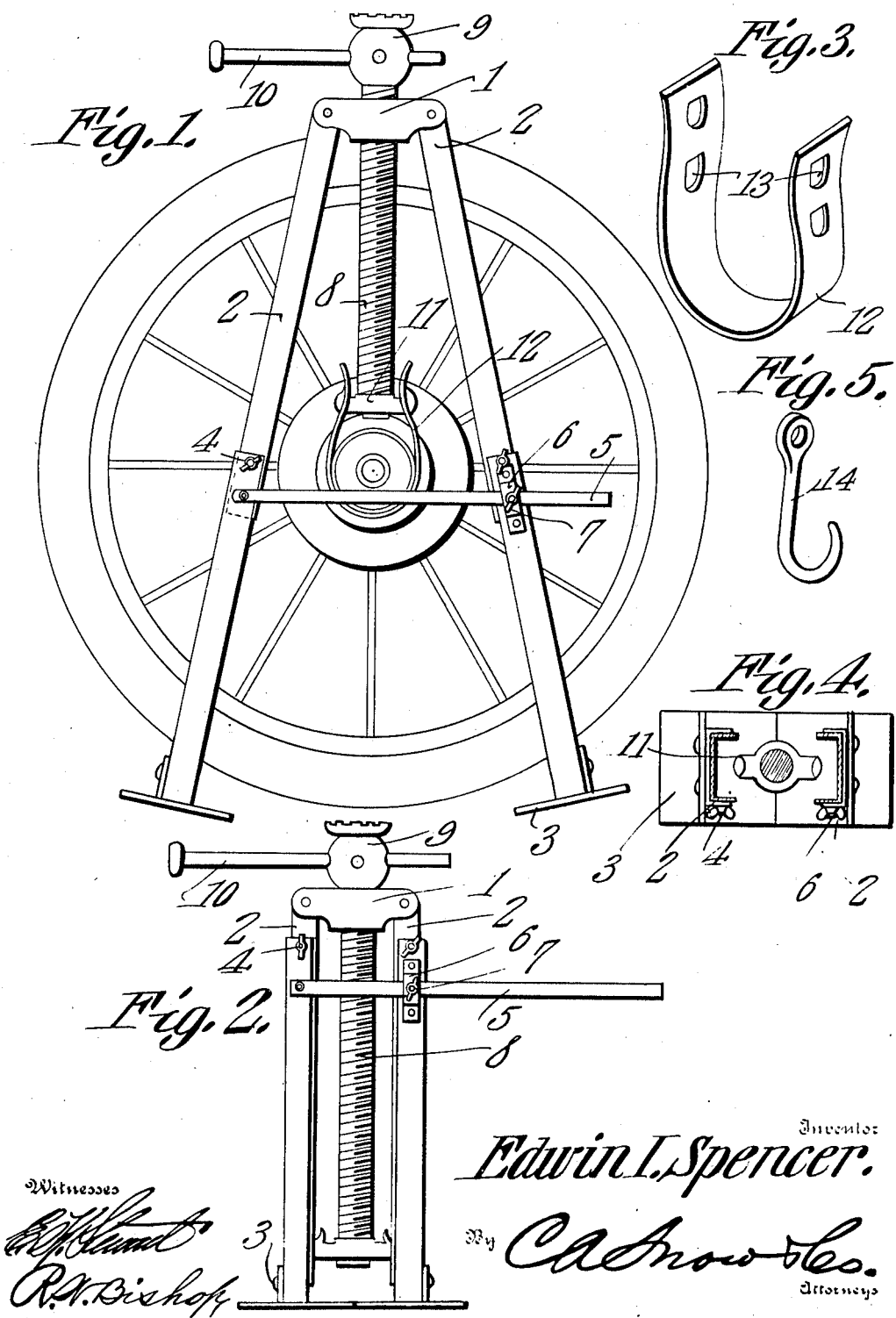

EDWIN I. SPENCER, OF WICHITA, KANSAS.

JACK FOR AUTOMOBILES.

953,157.  Specification of Letters Patent.  Patented Mar. 29, 1910.

Application filed August 2, 1909. Serial No. 510,829.

*To all whom it may concern:*

Be it known that I, EDWIN I. SPENCER, a citizen of the United States, residing at Wichita, in the county of Sedgwick and State of Kansas, have invented a new and useful Jack for Automobiles, of which the following is a specification.

This invention relates to improvements in jacks for vehicles and has especial reference to a device adapted to lift the wheels of automobiles from ditches and ruts in places where is is inconvenient to obtain a footing for the jack beneath the axle.

The invention consists in an adjustable frame which is adapted to pass over the end of the axle and rest upon the ground at opposite sides of the same and in which is mounted a lifting screw carrying means for engaging the end of the axle so that upon rotation of the screw the axle will be lifted and the wheel removed from the ditch or rut into which it has fallen. Such a device is illustrated in the accompanying drawings and the invention consists in certain novel features of the same, as will be hereinafter first fully described and then pointed out in the appended claim.

In the drawings:—Figure 1 is an elevation of my improved jack in its operative position; Fig. 2 is a similar view showing the device folded; Fig. 3 is a detail perspective view of the hanger or strap for engaging the hub or end of the axle; and Fig. 4 is a detail horizontal section; Fig. 5 is a detail view of a hook which may be employed to lift the wheel by engaging the spokes of the same.

In carrying out my invention I employ a head 1, to the opposite ends of which are pivoted the legs 2 which are constructed of two members, preferably of channel iron, adapted to telescope and having the lower members provided with broad feet 3 adapted to rest upon the ground, as clearly shown in Fig. 1. In the preferred form of the invention, which is illustrated in the drawings, the lower member of the legs 2 fits over the upper member and carries a set screw 4 which is adapted to bind against the side of the upper member and thereby secure the two members in their adjusted positions. In order to prevent collapse of the device while in use, a brace 5 is pivoted at one end to one of the supporting legs and projects therefrom to pass through a keeper 6 on the side of the other leg and is secured at the proper point by means of a set screw 7 mounted in the said keeper and binding against the brace, as will be readily understood. The lifting screw 8 is threaded within the head 1 and is provided at its upper end with the usual socketed head 9 adapted to be engaged by a lever or turning rod 10 so that rotary movement may be imparted to the screw and the screw thereby caused to travel up or down within the head 1 of the support. At the lower end of the screw, I provide a double hook 11 which is swiveled on this screw and is adapted to be engaged by the hanger or strap 12 which is passed around the axle or end of the hub and has its ends provided with transverse openings 13 adapted to be engaged over the hooks 11 so that when the screw 8 is moved upward the said strap or hanger will be caused to draw upon the axle or hub of the automobile and thereby lift the same, as will be readily understood. Should the projecting end of the hub not be long enough to permit the use of the strap 12, the hooks 14 are hung on the double hook 11 and engaged under the spokes of the wheel so that upon rotation of the screw a lifting force will be applied to the wheel.

In using the ordinary lifting jacks or jack screws to remove automobile wheels from deep ruts or ditches, it is necessary to dig around the wheel so as to form a hole or opening in the ground in which the jack may be placed beneath the axle. This work necessarily consumes considerable time and is very laborious. In using my device the supporting frame is simply opened and placed upon the ground adjacent the side of the wheel with the end of the hub or axle projecting between the supporting legs and below the end of the screw. The hanger or strap is then passed beneath the axle or hub and its ends engaged over the hooks 11 and the operating lever 10 then swung horizontally so as to rotate the screw, whereupon the screw will ride upward through the head 1 and will draw the wheel from the ditch.

The device is extremely simple in its construction, can be readily set up for use or put aside for storage or transportation and efficiently performs the desired work.

Having thus described my invention, what I claim is:—

A jack adapted to pass over the end of an axle close to the wheel thereof consisting of a head, a telescoping supporting member pivoted to and depending from each end of the head, the said members being provided with rigid feet at their lower ends projecting laterally beyond the sides of the said members, a brace pivoted to one of said members and adjustably secured to the other member, a lifting screw threaded in the head and extending through the same, a hook swiveled on the lower end of said screw, and wheel engaging means suspended on said hook.

In testimony that I claim the foregoing as my own, I have hereto affixed my signature in the presence of two witnesses.

EDWIN I. SPENCER.

Witnesses:
A. C. WATTS,
F. A. DOBSON.